(12) United States Patent
Hoffmann et al.

(10) Patent No.: US 6,525,158 B1
(45) Date of Patent: *Feb. 25, 2003

(54) PROCESS FOR THE STABILIZATION OF A STABILIZER MIXTURES FOR RECYCLED PLASTIC MIXTURES

(75) Inventors: Kurt Hoffmann, Lautertal (DE); Heinz Herbst, Lautertal-Reichenbach (DE); Rudolf Pfaendner, Rimbach/Odenwald (DE); Hans-Jürgen Sander, Lorsch (DE); Franciszek Sitek, Therwil (CH)

(73) Assignee: Ciba Specialty Chemicals Corporation, Tarrytown, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1058 days.

(21) Appl. No.: 08/977,110

(22) PCT Filed: Sep. 14, 1993

(86) PCT No.: PCT/EP93/02485
§ 371 (c)(1),
(2), (4) Date: Mar. 21, 1995

(87) PCT Pub. No.: WO94/07950
PCT Pub. Date: Apr. 14, 1994

Related U.S. Application Data

(63) Continuation of application No. 08/723,717, filed on Sep. 30, 1996, now abandoned, which is a continuation of application No. 08/403,912, filed on Mar. 21, 1995, now abandoned.

(30) Foreign Application Priority Data

Sep. 25, 1992 (CH) ................................. 3011/92
Sep. 14, 1993 (WO) ................ PCT/EP93/02485

(51) Int. Cl.$^7$ ............................. C08J 11/04; C08K 3/22; C08K 5/105; C08K 5/524
(52) U.S. Cl. .................. 527/47; 521/46.5; 524/433; 524/400; 524/128; 524/349; 524/348; 524/315
(58) Field of Search ..................... 521/47, 46.5

(56) References Cited

U.S. PATENT DOCUMENTS

| | | | | |
|---|---|---|---|---|
| 3,285,855 A | * | 11/1966 | Dexter | 524/291 |
| 3,903,208 A | * | 9/1975 | Hofer et al. | 524/126 |
| 3,954,847 A | * | 5/1976 | Hofer et al. | 524/126 |
| 4,102,974 A | * | 7/1978 | Boni | 525/239 |
| 4,183,845 A | * | 1/1980 | McGee | 525/240 |
| 4,420,580 A | * | 12/1983 | Herman et al. | 524/425 |
| 4,425,457 A | * | 1/1984 | Christiansen et al. | 524/425 |
| 4,443,572 A | * | 4/1984 | Burns | 524/120 |
| 4,786,678 A | * | 11/1988 | Dobreski et al. | 525/240 |
| 4,826,735 A | * | 5/1989 | Ueki et al. | 524/400 |
| 4,826,897 A | * | 5/1989 | Mehra et al. | 524/425 |
| 5,389,709 A | * | 2/1995 | Itamura et al. | 525/240 |
| 5,504,122 A | * | 4/1996 | Michel et al. | 521/46.5 |
| 5,635,556 A | * | 6/1997 | Rosenthal | 521/46.5 |

FOREIGN PATENT DOCUMENTS

| | | | |
|---|---|---|---|
| DE | 3322938 | * | 1/1985 |
| FR | 2528056 | * | 12/1983 |
| JP | 57-20346 | * | 11/1982 |
| JP | 01-020249 | * | 1/1989 |

OTHER PUBLICATIONS

CA: 98 199231 c (1983).*
Herman, T.J. "Melt . . . Polypropylene"—Developments in Polymer Stabilization–1,G. Scott, ed. 39–43,80–82 (1979).*
Kumststoffe., 82 9 (1992) p. 783–787.
Chem. Abst. 100:193015y (1984).
Chem. Abst. 102:167333X (1985).
CA 98:199231 (1993).
Derwent Abst. 89–066593/09/ (1987).
CA 118:148911y (1993).
CA 118:235360M (1993).
CA 118:214407S (1993).
CA 118:104264K (1993).

* cited by examiner

Primary Examiner—Peter Szekely
(74) Attorney, Agent, or Firm—David R. Crichton; Luther A. R. Hall

(57) ABSTRACT

Recycled mixtures of plastics, predominantly thermoplastics, as predominantly produced in the household, in commerce and also in industry and useful material collections, can be stabilized against thermooxidative degradation by adding a combination of a sterically hindered phenol with an organic phosphite or phosphonite and an inorganic compound from the series consisting of metal oxides, hydroxides and carbonates.

3 Claims, No Drawings

PROCESS FOR THE STABILIZATION OF A STABILIZER MIXTURES FOR RECYCLED PLASTIC MIXTURES

This application is a continuation of application Ser. No. 08/723,717, filed Sep. 30, 1996, now abandoned which is a continuation of application Ser. No. 08/403,912, filed Mar. 21, 1995, which is now abandoned.

The invention relates to a process for the stabilization of recycled plastic mixtures, as predominantly produced in the household, in commerce and also in industry and in useful material collections, and to the stabilizer mixtures which can be used for this purpose.

Recycling of waste is a problem of increasing importance for ecological reasons. The recycling of paper, textiles, glass or metals is already carried out on a large scale, whether by separate collection or by sorting of the refuse. The recycling of plastic waste and used plastics is also an increasing aim. Thermoplastics are generally processed by re-melting.

However, the plastic waste produced in the household, in commerce or in industry or the plastic materials or used plastics obtained from collections or a return obligation, for example in specific sectors of industry, such as the automobile industry, electrical industry, agriculture or the packaging industry, predominantly comprises thermoplastics based on polyolefins, styrene polymers, polyvinyl chloride or polyethylene terephthalate.

These used plastics, which may constitute useful raw materials, can be obtained either as a single material or as a mixture.

The recycling of plastic waste frequently means the use of a mixture of different types of plastic. Known industrial separation methods, for example hydrocyclone separation, mostly give only moderately clean fractions of various plastic mixtures, for example a polyolefin mixture.

The use of plastic mixtures is associated with technical problems, since individual types of plastic have only restricted miscibility with one another, or none at all. Although various types of thermoplastics can be processed by melting and moulding, the resultant mixtures (polyblends) of immiscible plastics are inhomogeneous when considered microscopically, i.e. on a microscopic level they comprise different solid phases. This has a considerable adverse effect on the mechanical properties. Recyclates of this type can generally only be used for purposes where relatively low strength requirements are made, for example as fillers or where thick-walled parts are used, for example noise protection dams.

Typical incompatible combinations which occur in domestic refuse are, for example, polyethylene and PVC or polyethylene and polystyrene or PET and polyolefins. In order to solve this problem, it has been proposed to add polymeric compatibilizers, also known as solid phase dispersants. Thus, for example, the addition of chlorinated polyethylene is capable of homogenizing mixtures of polyethylene and PVC. The addition of styrene-butadiene copolymers is capable of homogenizing mixtures of polyolefins and polystyrene. As a result of such a homogenization, the mechanical properties improve so much that these polyblends are also suitable for high-performance uses. A review of these developments is given by C. Sadrmohaghegh, G. Scott and E. Setudeh in Polym. Plast. Technol. Eng. 24 (1985), 149–185.

In an article which appeared in Polymer Eng. and Science, Vol. 17, pp. 700–705 (1977), the effect of small amounts of PVC and CPE on recycled polyethylene is studied, the authors observing that satisfactory stabilization of such recyclates is still not possible.

For the stabilization of recycled high-density polyethylene, P. Vink, R. T. Rotteveel and J. D. M. Wisse in Polymer Degr. and Stability, Issue 9, p. 133 (1984) studied various stabilizers from the classes of the phosphites, hindered phenols, benzotriazoles, hindered amines and phosphonites.

These authors also indicated that the recyclates must be re-stabilized Although the plastics have mostly been treated originally with stabilizers against thermooxidative and in some cases also against photooxidative degradation, these stabilizers are lost during use of the plastics, during storage of the waste and during processing of the recyclates, in some cases due to migration, extraction or by degradation. In addition, a recycled plastic generally differs structurally and also chemically from a new plastic as a consequence of the prior use or due to storage and processing; for example, sites of attack for oxidative degradation may already have formed. A recycled plastic therefore requires, for example, a relatively large amount of stabilizers or alternatively stabilizers which take into account these particular circumstances. The difficulty of finding suitable stabilizers is due to the specific type of previous damage/impurities, which may have taken place over an extended period.

Stabilization of a plastic mixture is also a difficult task, since each type of polymer makes specific requirements of the stabilizers. Thus, for example, completely different stabilizers are used for vinyl chloride polymers than for polyolefins or styrene polymers.

It would therefore be necessary to add a mixture of various stabilizers in order to stabilize a plastic mixture. In the case of complex plastic mixtures, this is a complicated method. In addition, various stabilizers can have adverse effects on one another or a stabilizer for one component can be damaging for the other component.

This problem has also been studied in the abovementioned literature and in Europ. Polym. J. 18 (1982), 1007, and the authors come to the conclusion that certain nickel complexes, in particular nickel dialkyldithiocarbamates, effect the best stabilization both against thermooxidative and against photooxidative degradation of polyethylene/polystyrene and polyethylene/polypropylene blends which have been homogenized by means of a compatibilizer. There is no mention therein of the stabilization of recyclates also containing PVC or of complex recyclate mixtures.

From U.S. Pat. No. 4,443,572, JP-A-57-202,346, JP-A-01/020,249 and FR-A-2 528 056 it is known to use a mixture including a phenol, a pentaerythritol diphosphite and a selected inorganic compound in certain virgin plastics.

It has now been found that mixed recycled plastics can be stabilized in a simple and economical manner against thermooxidative degradation during processing and subsequent use by means of a mixture of stabilizers known per se.

The invention relates to a process for the stabilization of mixtures of recycled plastics, predominantly thermoplastics, obtained from domestic, commercial and industrial waste or from useful material collections, which comprises adding from 0.01 to 15% by weight of a mixture of a) at least one sterically hindered phenol, b) at least one organic phosphite or phosphonite and c) at least one inorganic compound from the series consisting of metal oxides, hydroxides and carbonates to these plastics.

The a:b weight ratio is preferably from 20:1 to 1:20, particularly preferably from 10:1 to 1:1:10, very particularly preferably from 4:1 to 1:4. The (a+b):c weight ratio is preferably from 10:1 to 1:20, particularly preferably from 5:1 to 1:10, very particularly preferably from 3:1 to 1:3.

The plastic mixtures to be stabilized are, for example, used plastics from households and commerce (for example supermarkets), which predominantly originate from packaging materials. These can be, for example, films, bags, bottles and other containers or foams. Other materials may also be present. However, it is also possible for mixtures of plastics which have been previously damaged by use, storage or processing to be stabilized. These materials originate, for example, from useful material collections or return obligations, for example from the automobile industry, electrical/electronic industry, construction, agriculture and the textile industry.

The invention therefore relates to the stabilization of recycled plastic mixtures of this type which comprise 25–100% by weight, in particular 35–99% by weight, of polyolefins, 0–25% by weight of polystyrene, 0–25% by weight of polyvinyl chloride and 0–25% by weight of other thermoplastics, it also being possible for mixtures to be present within these groups of thermoplastics. Non-thermoplastics may also be present in the mixture in small amounts.

In particular, the invention relates to the stabilization of recycled plastic mixtures of this type which comprise 55–95% by weight of polyolefins, 5–25% by weight of polystyrene, 0–15% by weight of polyvinyl chloride and 0–10% by weight of other thermoplastics.

Also preferred are recycled mixtures of polyethylene and polypropylene.

In plastic mixtures, the dominant polyolefins are usual polyethylene (PE) and polypropylene (PP), in particular low-density polyethylene (UDPE), linear low-density polyethylene (LLDPE) and high-density polyethylene (HDPE), furthermore copolymers such as ethylene-propylene (EPM) and ethylene-propylene-diene (EPDM) copolymers and ULDPE-MDPE. Polystyrene (PS and EPS) is also taken to mean copolymers containing styrene (for example ABS, ASA, HIPS and IPS), and polyvinyl chloride (PVC) is also taken to mean copolymers predominanty comprising vinyl chloride (for example CPE). Of other thermoplastics, useful material collections principally contain polyethylene terephthalate (PET), and in addition polyamides, polycarbonate, cellulose acetate and polyvinylidene chloride. Secondary amounts, up to about 5%, of non-thermoplastics, for example polyurethanes, formaldehyde resins and phenolic resins, and typical amino resins, and also elastomers, for example vulcanized or unvulcanized rubber, may also be present. In certain plastic wastes, small amounts of foreign substances, for example paper, pigments and adhesives, which are frequently difficult to remove, may also be present. These foreign substances may also originate from contact with diverse substances during use or processing, for example fuel residues, paint components, traces of metal, initiator residues or traces of water.

From 0.05 to 5% by weight of the mixture of a, b and c are preferably added to the recyclate. From 0.1 to 2% by weight of the mixture of a, b and c are particularly preferably added. From 0.1 to 1% by weight is very particularly preferably added The sterically hindered phenols used as component a are known stabilizers against thermooxidative ageing of plastics, in particular polyolefins. These compounds preferably contain at least one group of the formula

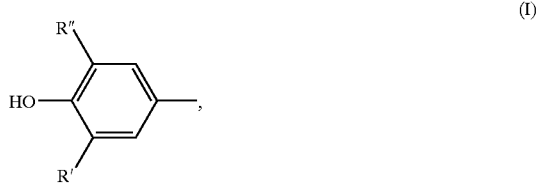

in which

R' is hydrogen, methyl or tert-butyl, and

R" is substituted or unsubstituted alkyl or substituted or unsubstituted thioether.

Examples of sterically hindered phenols of this type are: 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-i-butylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-dinonyl-4-methylphenol, 2,6-di-tert-butyl-4-methoxyphenol, 2,5-di-tert-butylhydroquinone, 2,5-di-tert-amylhydroquinone, 2,6-diphenyl-4-octadecyloxyphenol, 2,2'-thiobis(6-tert-butyl-4-methylphenol), 2,2'-thiobis(4-octylphenol), 4,4'-thiobis(6-tert-butyl-3-methylphenol), 4,4'-thiobis(6tert-butyl-2-methylphenol), 2,2'-methylenebis(6-tert-butyl-4-methylphenol), 2,2'-methylenebis(6-tert-butyl-4-ethyphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,αdimethylbenzyl)-4-nonyl-phenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,3,5-tris(3,5-di-tert-butyl-4-hydroxybenzyl)-2,4,6-trimethyl benzene, bis(3,5-di-tert-butyl-4hydroxybenzyl)sulfide, isooctyl 3,5-di-tert-butyl-4-hydroxybenzylmercaptoacetate, bis(4-tert-butyl-3-hydroxy-2,6-dimethylbenzyl)dithioterephthalate, 1,3,5-tris(3,5-di-tert-butyl-4-hydroxybenzyl)isocyanurate, 1,3,5-tris(4-tert-butyl-3-hydroxy-2,6-dimethylbenzyl) isocyanurate, dioctadecyl 3,5-di-tert-butyl-4-hydroxybenzylphosphonate and the calcium salt of monoethyl 3,5-di-tert-butyl-4-hydroxybenzylphosphonate.

Component a is particularly preferably a compound containing at least one group of the formula

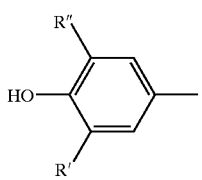

in which
R' is methyl or tert-butyl; and
R" is substituted or unsubstituted alkyl or substituted or unsubstituted thioether.

Examples of such hindered phenols are the esters of β-(3,5-di-tert-butyl-4-hydroxyphenyl)propionic acid and of β-(5-tert-butyl-4-hydroxy-3-methylphenyl)propionic acid with monohydric or polyhydric alcohols, for example with methanol, octadecanol, 1,6-hexanediol, neopentyl glycol, thiodiethylene glycol, diethylene glycol, triethylene glycol, pentaerythritol, tris(hydroxyethyl)isocyanurate, N,N'-bis (hydroxyethyl)oxalamide, and the amides of these acids, for example N,N'-bis(3,5-di-tert-butyl-4-hydroxyphenyl-propionyl)hexamethylenediamine, N,N'-bis(3,5-di-tert-butyl-4-hydroxyphenyl-propionyl)trimethylenediamine and N,N'-bis(3,5-di-tert-butyl-4-hydroxyphenyl-propionyl) hydrazine.

Also particularly preferred are the following compounds:

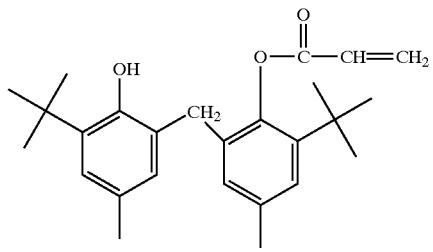

{2-(1,1-dimethylethyl)-6[[3-(1,1-dimethylethyl)-2-hydroxy-5-methylphenyl]-methyl]-4-methylphenyl 2-propenoate};

{benzenepropanoic acid 3,5-bis(1,1-dimethyl-ethyl)-4-hydroxy-1,6hexanediylester};

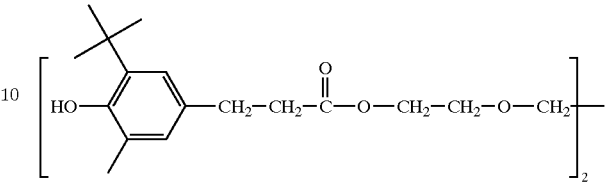

{benzenepropanoic acid 3-(1,1-dimethylethyl)-4-hydroxy-5-methyl-1,2-ethanediylbis(oxy-2,1-ethanediyl)ester};

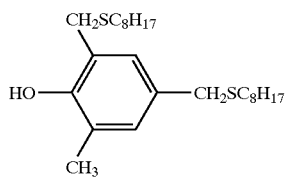

{2-methyl-4,6-bis[(octylthio)methyl]phenol)};

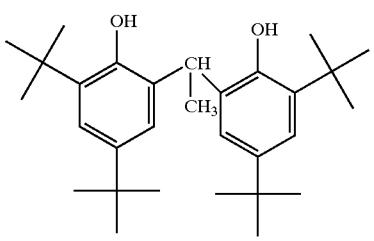

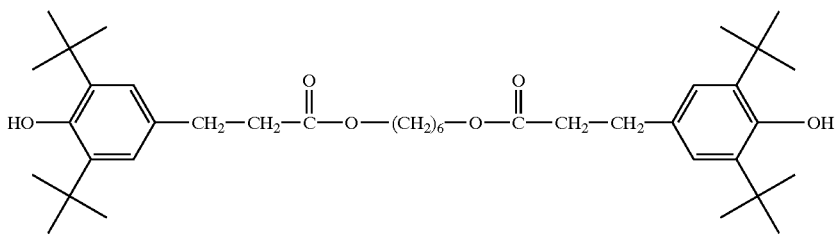

{2,2'-ethylidene-bis-(4,6-di-tert.butylphenol)};

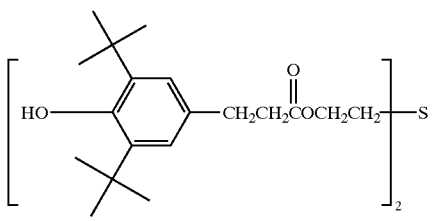

{benzenepropanoic acid 3,5-bis(1,1-dimethylethyl)-4-hydroxy-thiodi-2,1-ethanediylester};

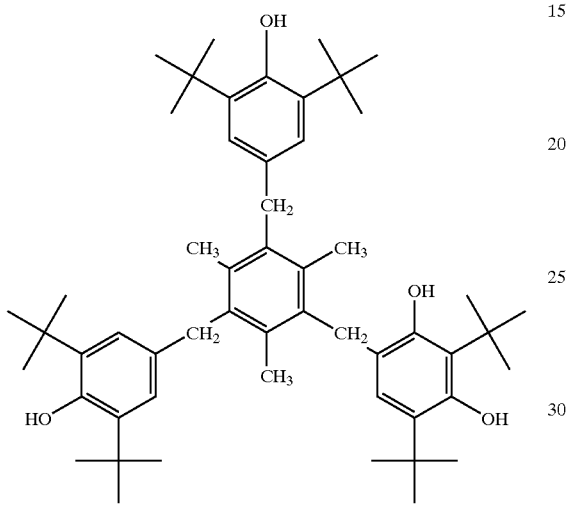

{4,4',4"-[(2,4,6-trimethyl-1,3,5-benzenetriyl)tris(methylene)]tris[2,6-bis(1,1-dimethylethyl)phenol]};

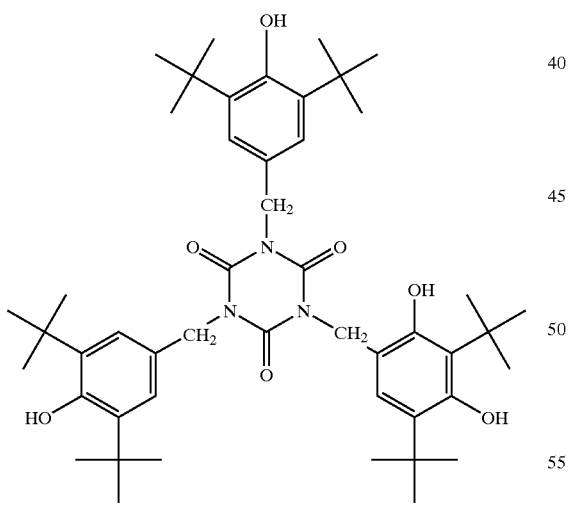

{1,3,5-tris[[3,5-bis(1,1-dimethylethyl)-4-hydroxyphenyl]methyl]-1,3,5-triazine-2,4,6(1H,3H,5H)-trione}.

Component a is most preferably a pentaerythritol ester or octadecyl ester of β-(3,5-di-tert-butyl-4-hydroxyphenyl) propionic acid or 2,2'-ethylidenebis(4,6-di-tert-butylphenol).

The organic phosphites and phosphonites used as component b are likewise known as stabilizers for plastics. They are used, in particular, as processing stabilizers for polyolefins.

They are predominantly aromatic phosphites and phosphonites, for example triphenyl phosphite, diphenyl alkyl phosphites, trictadecyl phosphite, phenyl dialkyl phosphites, tris(nonylphenyl)phosphite, trilauryl phosphite, distearyl pentaerythrityl diphosphite, tris(2,4-di-tert-butylphenyl)phosphite, distearyl pentaerythrityl diphosphite, bis(2,4-di-tert-butylphenyl)pentaerythrityl diphosphite, tristearyl sorbityl triphosphite, tetrakis(2,4-di-tert-butylphenyl)-4,4'-biphenylene diphosphonite, 3,9-bis(2,4-di-tert-butyl-4-methylphenoxy)-2,4,8,10-tetraoxa-3,9-diphosphaspiro[5.5]undecane, 3,9-tris(2,4,6-tis-tert-butylphenoxy)-2,4,8,10-tetraoxa-3,9-diphosphaspiro[5,5]undecane and 2,2'-ethylidenebis(4,6-di-tert-butylphenyl)fluorophosphite.

Preferred compounds are tris-(2,4-di-tert.butylphenyl)phosphite;

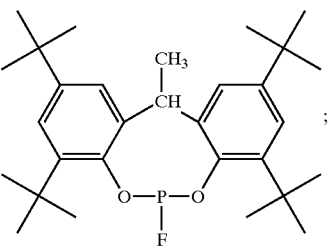

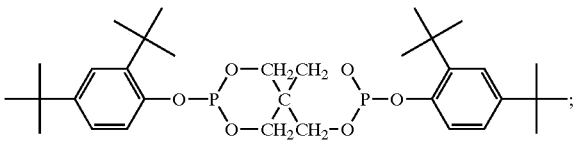

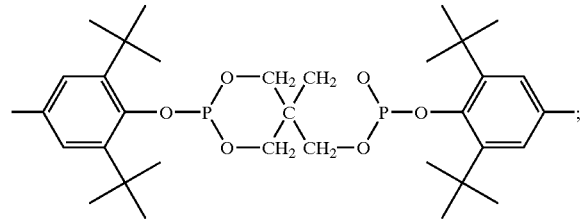

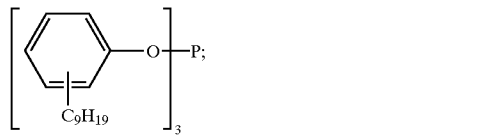

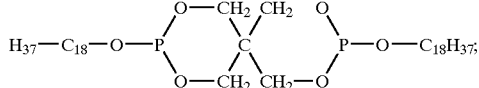

and

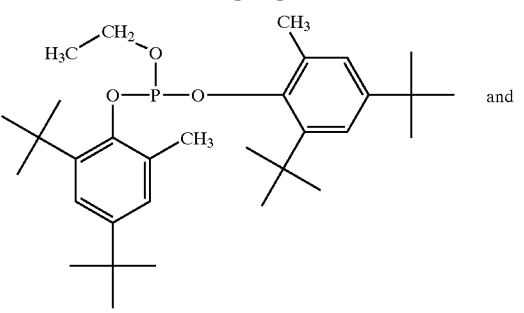

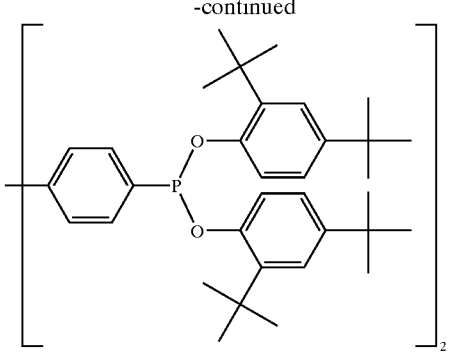

Component b is particularly preferably tris(2,4-di-tert-butylphenyl)phosphite.

Component c is an inorganic compound from the series consisting of metal oxides, hydroxides and carbonates.

These are in particular metal oxides, hydroxides or carbonates of elements from main group II or sub-group II, IV or VII. Preference is given to calcium, magnesium, zinc, titanium and manganese as metals, the oxides being particularly preferred, such as CaO MgO, ZnO, $TiO_2$, $MnO_2$ and very particularly calcium, magnesium and zinc oxide. Calcium oxide is most preferred.

It is also possible to use a mixture of various compounds for components a, b and c. For example, component c can be a mixture of calcium oxide and calcium carbonate.

An example which may be given of a metal hydroxide is magnesium hydroxide, and an example which may be given of a metal carbonate is calcium carbonate. It is also possible to use salts with different anions, for example magnesium aluminium hydroxycarbonates, known as hydrotalcites.

Other suitable stabilizers from the series consisting of the lactates, for example calcium lactate or calcium stearoyl-2-lactylate, or lactones, for example

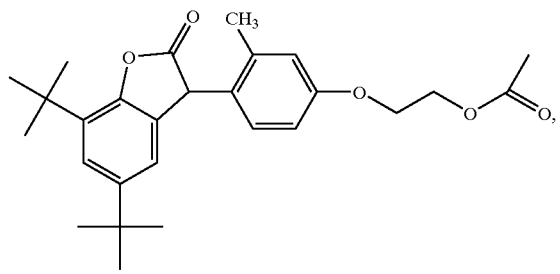

may additionally be added.

The present invention furthermore relates to stabilizer mixtures and to the use thereof for the stabilization of recycled mixtures of plastics, predominantly thermoplastics, obtained from domestic, commercial and industrial waste or useful material collections, these stabilizer mixtures comprising a) at least one sterically hindered phenol, b) at least one organic phosphite or phosphonite and c) at least one inorganic compound from the series consisting of metal oxides, hydroxides and carbonates.

Pariticularly preferred stabilizer mixtures comprise per 100 parts (by weight)

(A) as component a) 5–50 parts of the pentaerythrityl ester of β-(3,5-di-tert-butyl-4-hydroxyphenyl) propionic acid, as component b) 5–50 parts of tris-(2,4-di-tert-butylphenyl)phosphite and as component c) 5–90 parts of calcium oxide;

(B) as component a) 5–50 parts of the octadecyl ester of β-(3,5-di-tert-butyl-4-hydroxy-phenyl)propionic acid, as component b) 5–50 parts of tris-(2,4-di-tert-butylphenyl)phosphite and as component c) 5–90 parts of calcium oxide;

(C) as component a) 5–50 parts of 2,2'-ethyliden-bis-(4,6-di-tert-butylphenol), as component b) 5–50 parts of tris-(2,4-di-tert-butylphenyl)phosphite and as component c) 5–90 parts of calcium oxide;

(D) as component a) 10–30 parts of the octadecyl ester of β-(3,5--tert-butyl-4-hydroxy-phenyl)propionic acid, as component b) 10–30 parts of tris-(2,4-di-tert-butylphenyl)phosphite and as component c) 30–70 parts of calcium oxide; or (E) as component a) 5–30 parts of the octadecyl ester of β-(3,5-di-tert-butyl-4-hydroxy-phenyl)propionic acid, as component b) 5–30 parts of tris-(2,4-di-tert-butylphenyl) phosphite, as component c) 540 parts of calcium oxide, as well as 10–50 parts of calcium stearate.

The present invention furthermore relates to recycled mixtures of plastics, predominantly thermoplastics, obtained from domestic, commercial and industrial waste or useful material collections, these recycled mixtures comprising a) at least one sterically hindered phenol, b) at least one organic phosphite or phosphonite and c) at least one inorganic compound from the series consisting of metal oxides, hydroxides and carbonates.

Preferred recycled mixtures of plastics, predominantly thermoplastics, preferred stabilizer mixtures and their use conform in their components and mixing ratios to the preferences described in greater detail under the process.

The addition of these combinations to the recyclate allows thermoplastic processing with reduced degradation and/or extends the service life of the materials produced from the recyclate. This is true irrespective of whether a compatibilizer is added to the recyclate or not. However, the addition of the combination of a, b and c is of particular significance for recyclates to which is added a polymer or polymer mixture which increases the compatibility of the individual plastics with one another, since this polymer generally also requires stabilization.

Further conventional plastic additives can also be polymers which improve the material properties of the previously damaged plastic, for example elastomers (impact modifiers) and compatibilizers. Impact modifiers are homopolymers or copolymers which are able to modify brittle polymers so that they remain tough even at low temperatures. EP(D)M polymers, ABR, BR and SBR graft polymers, inter alia, are suitable for this purpose.

The compatibilizers can be, for example, copolymers, in particular block copolymers, of styrene with butadiene and, if desired, acrylonitrile. They can be copolymers of ethylene and propylene, and may contain a third monomer component, for example butadiene.

Chlorinated polyethylene or ethylene-vinyl acetate copolymers are also suitable as compatibilizers, naturally depending on the particular composition of the recyclate.

Further suitable compatibilizers contain, in particular, polar groups, e.g. maleic anhydride-styrene copolymers or graft polymers containing acrylic acid groups, maleic anhydride groups or glycidyl groups.

These polymeric compatibilizers are generally used in amounts of 2–20% by weight, based on the plastic mixture.

The stabilizing action of the mixture of a, b and c, in particular the long-term stability, may be synergistically increased, if desired, by the addition of so-called thiosynergists. These are aliphatic thioethers, in particular esters of thiodipropionic acid. Examples are the lauryl, stearyl, myristyl and tridecyl esters of thiodipropionic acid or distearyl disulfide. These thiosynergists are preferably used in an amount of from 0.1 to 1% by weight, based on the recyclate.

If high light stability is also required of the article produced from the recyclate, the addition of one or more light stabilizers is advisable. Suitable light stabilizers are, in particular, those from the series consisting of the benzophenones, benzotriazoles, oxanilides and sterically hindered amines. Examples of such compounds are:

2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-($\alpha$,$\alpha$-dimethylbenzyl)-2'-hydroxyphenyl)benzotriazole, mixture of 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethtyl)phenyl) benzotriazole, 2-(3'-tert-butyl-5'-[2-(2-ethylhexyloxy) carbonylethyl]-2'-hydroxyphenyl)benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—$CH_2CH_2$—$COO(CH_2)_3$]$_2$, where R=3'-tert-butyl-4'-hydroxy-5'-2H-benzotriazol-2-ylphenyl.

2.2. 2-Hydroxybenzophenones, for example the 4hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutylphenyl salicylate, phenyl salicylate, octylphenyl salicylate, dibenzoyl resorcinol, bis(4-tert-butylbenzoyl)resorcinol, benzoyl resorcinol, 2,4-di-tertbutylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate. benzoate.

2.4. Acrylates, for example ethyl $\alpha$-cyano-$\beta$,$\beta$-diphenylacrylate, isooctyl $\alpha$-cyano-$\beta$,$\beta$-diphenylacrylate, methyl $\alpha$-carbomethoxycinnamate, methyl $\alpha$-cyano-$\beta$-methyl-p-methoxy-cinnamate, butyl $\alpha$-cyano-$\beta$-methyl-p-methoxy-cinnamate, methyl $\alpha$-carbomethoxy-p-methoxycinnamate and N-($\beta$-carbomethoxy-$\beta$-cyanovinyl)-2-methylindoline.

2.5. Nickel compounds, for example nickel complexes of 2,2'-thio-bis-[4-(1,1,3,3-tetra-methylbutyl) phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amines, for example bis(2,2,6,6-tetramethyl-piperidyl)sebacate, bis(2,2,6,6-tetramethyl-piperidyl)succinate, bis(1,2,2,6,6-pentamethylpiperidyl) sebacate, bis(1,2,2,6,6-pentamethylpiperidyl)n-butyl-3,5-di-tert-butyl-4-hydroxybenzylmalonate, the condensate of 1-(2-hydroxyethyl)-2,2,6,6-tetramethyl-4-hydroxypiperidine and succinic acid, the condensate of N,N'-bis(2,2,6,6-tetramethyl-4-piperidyl) hexamethylenediamine and 4-tert-octylamino-2,6-dichloro-1,3,5-triazine, tris(2,2,6,6-tetramethyl piperidyl) nitrilotriacetate, tetrakis(2,2,6,6-tetramethyl-4-piperidyl)-1,2,3,4-butane-tetracarboxylate, 1,1'-(1,2-ethanediyl)bis (3,3,5,5-tetramethylpiperazinone), 4-benzoyl-2,2,6,6-tetramethylpiperidine, 4-stearyloxy-2,2,6,6-tetramethylpiperidine, bis(1,2,2,6, 6pentamethylpiperidyl)-2-n-butyl-2-(2-hydroxy-3,5-di-tert-butylbenzyl)malonate, 3-n-octyl-7,7,9,9-tetramethyl-1,3,8-triazasprio[4.5]decan-2,4-dion, bis(1-octyloxy-2,2, 6,6-tetra-methylpiperidyl) sebacate, bis(1-octyloxy-2,2,6, 6-tetramethylpiperidyl)succinate, the condensate of N,N'-bis-(2,2,6,6-tetramethyl-4-piperidyl) hexamethylenediamine and 4-morpholino-2,6-dichloro-1, 3,5-triazine, the condensate of 2-chloro-4,6-bis(4-n-butyl-amino-2,2,6,6-tetramethylpiperidyl)-1,3,5-triazine and 1,2-bis(3-aminopropylamino)ethane, the condensate of 2-chloro-4,6-di-(4n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6tetramethyl-4-piperidyl) pyrrolidin-2,5-dione, 3-dodecyl-1-(1,2,2,6,6-pentamethylpiperidyl) pyrrolidine-2,5-dione and polysiloxanes containing 2,2,6, 6-tetramethyl-4-piperidyl groups.

2.7. Oxamides, for example 4,4'-dioctyloxyoxanilide, 2,2'-dioctyloxy-5,5'-di-tert-butoxanilide, 2,2'-didodecyloxy-5, 5'-di-tert-butoxanilide, 2-ethoxy-2'-ethoxanilide, N,N'-bis (3-methylaminopropyl)oxamide, 2-ethoxy-5-tert-butyl-2'-ethoxanilide and its mixture with 2-ethoxy-2'-ethyl-5, 4'-di-tert-butoxanilide and mixtures of ortho- and para-methoxy-disubstituted oxanilides and mixtures of o- and p-ethoxy-disubstituted oxanilides.

2.8. 2-(2-Hydroxyphenyl)-1,3,5-triazines, for example 2,4, 6-tris(2-hydroxy-4-octyloxyphenyl)-1,3, 5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2hydroxy-3-butyloxy-propoxy)phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine.

The light stabilizers are preferably added in an amount of from 0.01 to 2% by weight, in particular from 0.05 to 0.5% by weight, based on the plastic mixture. The light stabilizer used is preferably a combination of a benzotriazole with a sterically hindered amine.

The stabilizer mixtures according to the invention containing, if desired, the additives mentioned can be employed in compact or extruded form or on a support material, or added directly, as a mixture or in the form of powders, to the recyclate.

If required, further conventional plastic additives can be added to the recycled plastic mixture, for example fillers, such as sawdust or mica, reinforcing agents, such as glass fibres, glass beads or mineral fibres, pigments, plasticizers, lubricants, such as metal stearates or laurates, flameproofing agents, antistatics or blowing agents. These additives depend on the intended use of the recyclate. In a preferred embodiment, the lubricant used is calcium or zinc stearate or a mixture thereof.

The recyclates stabilized in this way can be used for a very wide variety of applications, for example for tubes, profiles, sheets, cable insulations, sports equipment, garden furniture, films, construction parts, parts of vehicles and machines and containers of all types, for example bottles.

The recyclate can also be mixed with new plastics or employed together with new plastics, for example in a coextrusion process.

The examples below illustrate the novel process and stabilizer mixture in greater detail. As in the remainder of the description, parts are parts by weight and percentages are per cent by weight, unless otherwise stated.

EXAMPLES 1–4

Purification of used plastic material from domestic refuse (lightweight fraction about 65%, heavy fraction about 30%, impurities about 5%) 10 kg of shredded used plastic material, contaminated with for example stones, metal, glass, are stirred into water. Due to the different densities of plastics, the predominantly polyolefin-containing lightweight fraction (density <1 g/cm$^3$) remains on the water surface, while the heavy fraction (density>1 g/cm$^3$, predominantly PVC, PS) deposits with the impurities on the bottom.

The lightweight fraction is decanted off and washed in a separate vessel until the washings are clear. Analogously, the heavy fraction is separated off by increasing the specific density of the water by addition of potassium carbonate, and is then washed.

The two fractions are then dried, weighed and re-combined. The used plastic material is subsequently comminuted in a centrifugal mill to a particle size of <2 mm.

Processing and Testing of the Used Plastic Material

The used plastic material purified as outlined above is homogenized with the stabilizers (Table 1) in a screw mixer and extruded in a single-screw compounder (temperature 220° C.). The granules are subsequently converted into sheets (thickness 2 mm) at 220° C. in an injection-moulding machine (Arburg 100). These sheets are subjected to artificial ageing at 185° C. for up to 180 minutes in a fan-assisted oven, and the colour difference, based on a white standard, is determined in accordance with ASTM D 1925-70 (calculated according to the formula: $\Delta E=(\Delta L^2+\Delta a^2\Delta b^2)^{1/2}$ in the Hunter coordinate system, the yellowness index being calculated from the formula: $Y1=100(0.72a+1.79b)/L$) (Table 1). Further test sheets are subjected to a dehydrochlorination test in accordance with DIN 53381-PVC/C (Table 2).

TABLE 1

| Stabilizer mixture | | Colour difference ΔE after | | | |
|---|---|---|---|---|---|
| | | 0 | 90 | 120 | 180 min |
| — | no stabilizer | 49.0 | 61.1 | >70 | n.d |
| Ex. 1 | 0.1% AO-1 + 0.1% P-1 + 1% M-1 | 48.9 | 55.2 | 55.3 | 57.1 |
| Ex. 2 | 0.2% AO-1 + 0.2% P-1 + 1% M-1 | 49.5 | 54.8 | 56.6 | 57.3 | n.d.: not determined n.d.: not determined

The colour difference values exhibit only a slight increase after oven ageing in the case of the recyclates stabilized according to the invention, while the unstabilized sample reaches, after only 120 minutes, a value which cannot meaningfully be measured, which is why the determination of this sample after 180 minutes was not carried out. The increase in the colour difference values indicates increasing discoloration and decomposition of the samples.

TABLE 2

| | Stabilizer mixture | Elimination of HCl |
|---|---|---|
| — | no stabilizer | 174 μS |
| Ex. 3 | 0.1% AO-1 + 0.1% P-1 + 1% M-1 | 54 μS |
| Ex. 4 | 0.2% AO-1 + 0.2% P-1 + 1% M-1 | 47 μS |

The values in Table 2 show a low conductivity after 200 minutes for the recyclates stabilized according to the invention, while a conductivity of 174 μS is measured for the unstabilized sample. Elimination of HCl (decomposition of the polymer) causes an increase in conductivity.

EXAMPLES 5–6

A used plastic material having the composition about 72% of polyolefins, about 18% of polystyrene, about 7% of polyvinyl chloride and about 3% of other polymers with addition of the stabilizers indicated in Table 2 is processed analogously to Examples 1 and 2, and the thermal stability is determined in accordance with DIN 53381-PVC/C (Table 3).

TABLE 3

| | Stabilizer mixture | Elimination of HCl |
|---|---|---|
| — | no stabilizer | 60 min |
| Ex. 5 | 0.1% AO-1 + 0.1% P-1 + 1% M-1 | 109 min |
| Ex. 6 | 0.06% AO1 + 0.14% P-1 + 1% M-1 | 132 min |

The time indicated for the elimination of HCl is the time until the conductivity of the sample has reached a value of 200 μS.

EXAMPLES 7 AND 8

Used plastic material as granules (average composition: HDPE/PP=95/5) is homogenized with the stabilizers (Table 4) in a screw mixer and subsequently extruded five times in a twin-screw compounder (temperature 240° C.). The melt flow index (MFI, 190° C., 10 kg) is determined in accordance with DIN 53 735F (ISO 1133/6) after the 1st, 3rd and 5th extrusions.

TABLE 4

| | Stabilizer mixture | Melt flow index after | | |
| --- | --- | --- | --- | --- |
| | | 1st | 3rd | 5th extrusion |
| — | no stabilizer | 5.8 | 6.0 | 6.4 |
| Ex. 7 | 0.02% AO-1 + 0.02% P-1 + 0.16% M-1 | 5.4 | 5.3 | 5.3 |
| Ex. 8 | 0.05% AO-1 + 0.05% P-1 + 0.1% M-1 | 5.3 | 5.3 | 5.3 |

The samples stabilized according to the invention exhibit only a slight increase in the melt flow index after repeated extrusion. Degradation reactions and decomposition of the polymer (chain breaking) cause an increase in the melt flow index.

The granules are subsequently converted into sheets (thickness 2 mm) at 240° C. in an injection-moulding machine (Arburg 100). These sheets are subjected to artificial ageing at 120° C. in a fan-assisted oven until they become brittle (Table 5):

TABLE 5

HDPE/PP = 95/5, artificial ageing (flexural test) at 120° C.

| | Stabilizer mixture | Days before embrittlement |
| --- | --- | --- |
| — | no stabilizer | 18 |
| — | 0.10% AO-1 + 0.10% P-1 | 37 |
| Ex. 7 | 0.02% AO-1 + 0.02% P-1 + 0.16% M-1 | 74 |
| Ex. 8 | 0.05% AO-1 + 0.05% P-1 + 0.10% M-1 | 116 |

Further test specimens are stored at 120° C. in a fan-assisted oven. Samples are taken after 500 hours, 1000 hours, 1500 hours and 2000 hours in order to determine the tensile impact strength in accordance with DIN 53448 (Table 6).

TABLE 6

Tensile impact strength of HDPE/PP = 95/5 after artifical ageing at 120° C.

| | Stabilizer mixture | Tensile impact strength (kJ/m$^2$) after | | | |
| --- | --- | --- | --- | --- | --- |
| | | 500 h | 1000 h | 1500 h | 2000 h |
| — | no stabilizer | 45 | 0 | — | — |
| — | 0.10% AO-1 + 0.10% P-1 | >1250 | >1250 | 0 | — |
| Ex. 7 | 0.02% AO-1 + 0.02% P-1 + 0.16% M-1 | >1250 | >1250 | 1044 | >1250 |
| Ex. 8 | 0.05% AO-1 + 0.05% P-1 + 0.10% M-1 | >1250 | >1250 | >1250 | >1250 |

EXAMPLES 9 AND 10

Shredded used plastic material (average composition: HDPE/PP=90/10) is homogenized with the stabilizers (Table 7) in a screw mixer and subsequently extruded five times in a twin-screw compounder (temperature 240° C.). The melt flow index (MFI, 190° C./10 kg) is determined in accordance with DIN 53735 F (ISO 1133/6) after the 1st, 3rd and 5th extrusions.

TABLE 7

Repeated extrusion of HDPE/PP = 90/10

| | Stabilizer mixture | Melt flow index after | | |
| --- | --- | --- | --- | --- |
| | | 1st | 3rd | 5th extrusion |
| — | no stabilizer | 6.4 | 6.7 | 7.2 |
| — | 0.10% AO-1 + 0.10% P-1 | 6.5 | 6.7 | 7.1 |
| Ex. 9 | 0.02% AO-1 + 0.02% P-1 + 0.16% M-1 | 6.1 | 6.4 | 6.6 |
| Ex. 10 | 0.05% AO-1 + 0.05% P-1 + 0.10% M-1 | 6.0 | 6.0 | 6.2 |

The samples stabilized according to the invention exhibit only a slight increase in the melt flow index after repeated extrusion. Degradation reactions and decomposition of the polymer (chain breaking) cause an increase in the melt flow index.

The granules are subsequently converted into sheets (thickness 2 mm) at 240° C. in an injection-moulding machine (Arburg 100). These sheets are subjected to artificial ageing at 120° C. in a fan-assisted oven until they become brittle (Table 8):

TABLE 8

HDPE/PP = 90/10, artificial ageing (flexural test) at 120° C.

| | Stabilizer mixture | Days before embrittlement |
| --- | --- | --- |
| — | no stabilizer | 18 |
| — | 0.10% AO-1 + 0.10% P-1 | 53 |
| Ex. 9 | 0.02% AO-1 + 0.02% P-1 + 0.16% M-1 | 71 |
| Ex. 10 | 0.05% AO-1 + 0.05% P-1 + 0.10% M-1 | 94 |

Further test specimens are stored at 120° C. in a fan-assisted oven. Samples are taken after 500 hours, 1000 hours, 1500 hours and 2000 hours in order to determine the tensile impact strength in accordance with DIN 53448 (Table 9).

TABLE 9

Tensile impact strength of HDPE/PP = 90/10 after artificial ageing at 120° C.

| | Stabilizer mixture | Tensile impact strength (kJ/m$^2$) after | | | |
| --- | --- | --- | --- | --- | --- |
| | | 500 h | 1000 h | 1500 h | 2000 h |
| — | no stabilizer | >1250 | 0 | — | — |
| — | 0.10% AO-1 + 0.10% P-1 | >1250 | >1250 | >1250 | 0 |
| Ex. 9 | 0.02% AO-1 + 0.02% P-1 + 0.16% M-1 | >1250 | >1250 | >1250 | >1250 |
| Ex. 10 | 0.05% AO-1 + 0.05% P-1 + 0.10% M-1 | 1074 | >1250 | 1076 | 1002 |

EXAMPLE 11

Shredded used plastic material (average composition HDPE/PP=80/20) is homogenized with the stabilizers (Table 10) in a screw mixer and subsequently extruded once in a twin-screw compounder (temperature 240° C.).

The granules are subsequently converted into sheets (thickness 2 mm) at 240° C. in an injection-moulding machine (Arburg 100). These sheets are subjected to artificial ageing at 120° C. in a fan-assisted oven until they become brittle (Table 10):

TABLE 10

HDPE/PP = 80/20, artificial ageing at 120° C.

| | Stabilizer mixture | Days before embrittlement |
|---|---|---|
| — | no stabilizer | 13 |
| — | 0.10% AO-1 + 0.10% P-1 | 37 |
| Ex. 11 | 0.05% AO-1 + 0.05% P-1 + 0.10% M-1 | 74 |

Further test specimens are stored at 120° C. in a fan-assisted oven. Samples are taken after 500 hours, 1000 hours, 1500 hours and 2000 hours in order to determine the tensile impact strength in accordance with DIN 53448 (Table 11).

TABLE 11

HDPE/PP = 80/20, tensile impact strength after artificial ageing at 120° C.

| | Stabilizer mixture | Tensile impact strength (kJ/m$^2$) after | | | |
|---|---|---|---|---|---|
| | | 500 h | 1000 h | 1500 h | 2000 h |
| — | no stabilizer | 38 | — | — | — |
| — | 0.10% AO-1 + 0.10% P-1 | 1037 | 986 | — | — |
| Ex. 11 | 0.05% AO-1 + 0.05% P-1 + 0.10% M-1 | 982 | 927 | 1010 | 837 |

EXAMPLE 12

Shredded used plastic material (average composition HDPE/PP/PVC=80/20/0.2) is homogenized with the stabilizers (Table 12) in a screw mixer and subsequently extruded once in a twin-screw compounder (temperature 240° C.).

The granules are subsequently converted into sheets (thickness 2 mm) at 240° C. in an injection-moulding machine (Arburg 100). These sheets are subjected to artificial ageing at 120° C. in a fan-assisted oven until they become brittle (Table 12):

TABLE 12

HDPE/PP/PVC = 80/20/0.2, artificial ageing at 120° C.

| | Stabilizer mixture | Days before embrittlement |
|---|---|---|
| — | no stabilizer | 22 |
| — | 0.10% AO-1 + 0.10% P-1 | 44 |
| Ex. 12 | 0.05% AO-1 + 0.05% P-1 + 0.10% M-1 | 50 |

Further test specimens are stored at 120° C. in a fan-assisted oven. Samples are taken after 500 hours, 1000 hours, 1500 hours and 2000 hours in order to determine the tensile impact strength in accordance with DIN 53448 (Table 13).

TABLE 13

Tensile impact strength of HDPE/PP/PVC = 80/20/0.2 after artificial ageing at 120° C.

| | Stabilizer mixture | Tensile impact strength (kJ/m$^2$) after | | |
|---|---|---|---|---|
| | | 500 h | 1000 h | 1500 h |
| — | no stabilizer | 997 | — | — |
| — | 0.10% AO-1 + 0.10% P-1 | 975 | 902 | — |
| Ex.12 | 0.05% AO-1 + 0.05% P-1 + 0.10% M-1 | 890 | 964 | 944 |

EXAMPLES 13–18

Used plastic material as granules (average composition: HDPE/PP=90/10; as in Examples 9 and 10, but of different origin) is homogenized with the stabilizers (Table 14) in a screw mixer and subsequently extruded five times in a twin-screw compounder (temperature 240° C.). The melt flow index (MFI, 190° C./10 kg) is determined in accordance with DIN 53735 F (ISO 1133/6) after the 1st, 3rd and 5th extrusions.

TABLE 14

Repeated extrusion of HDPE/PP = 90/10

| | Stabilizer mixture | Melt flow index after | | |
|---|---|---|---|---|
| | | 1st | 3rd | 5th extrusion |
| — | no stabilizer | 4.5 | 4.6 | 5.0 |
| Ex. 13 | 0.02% AO-1 + 0.02% P-1 + 0.16% M-1 | 3.8 | 3.8 | 4.0 |
| Ex. 14 | 0.04% AO-1 + 0.04% P-1 + 0.32% M-1 | 3.8 | 3.8 | 3.9 |
| Ex. 15 | 0.05% AO-1 + 0.05% P-1 + 0.10% M-1 | 4.0 | 4.0 | 4.1 |
| Ex. 16 | 0.10% AO-1 + 0.10% P-1 + 0.20% M-1 | 3.8 | 3.9 | 4.0 |

The samples stabilized according to the invention exhibit only a slight increase in the melt flow index after repeated extrusion. Degradation reactions and decomposition of the polymer (chain breaking) cause an increase in the melt flow index.

The granules are subsequently converted into sheets (thickness 2 mm) at 240° C. in an injection-moulding machine (Arburg 100). These sheets are subjected to artificial ageing at 120° C. in a fan-assisted oven until they become brittle (Table 15):

TABLE 15

HDPE/PP = 90/10, artificial ageing (flexural test) at 120° C.

| | Stabilizer mixture | Days before embrittlement |
|---|---|---|
| — | no stabilizer | 37 |
| Ex. 13 | 0.02% AO-1 + 0.02% P-1 + 0.16% M-1 | 84 |
| Ex. 14 | 0.04% AO-1 + 0.04% P-1 + 0.32% M-1 | 104 |
| Ex. 15 | 0.05% AO-1 + 0.05% P-1 + 0.10% M-1 | 126 |
| Ex. 16 | 0.10% AO-1 + 0.10% P-1 + 0.20% M-1 | 165 |
| Ex. 17 | 0.05% AO-2 + 0.05% P-1 + 0.10% M-1 | >84 |
| Ex. 18 | 0.10% AO-2 + 0.10% P-1 + 0.20% M-1 | >84 |

Further test specimens are stored at 120° C. in a fan-assisted oven. Samples are taken after 500 hours, 1000 hours, 1500 hours and 2000 hours in order to determine the tensile impact strength in accordance with DIN 53448 (Table 16).

TABLE 16

Tensile impact strength of HDPE/PP = 90/10 after artificial ageing at 120° C.

| | Stabilizer mixture | Tensile impact strength (kJ/m$^2$) after | | | |
|---|---|---|---|---|---|
| | | 500 h | 1000 h | 1500 h | 2000 h |
| — | no stabilizer | 777 | 37 | 0 | — |
| Ex. 13 | 0.02% AO-1 + 0.02% P-1 + 0.16% M-1 | >1250 | >1250 | >1250 | 1083 |
| Ex. 14 | 0.04% AO-1 + 0.04% P-1 + 0.32% M-1 | >1250 | >1250 | >1250 | 1074 |
| Ex. 15 | 0.05% AO-1 + 0.05% P-1 + 0.10% M-1 | 1050 | >1250 | >1250 | 1074 |
| Ex. 16 | 0.10% AO-1 + 0.10% P-1 + 0.20% M-1 | >1250 | >1250 | >1250 | 950 |

EXAMPLES 19–22

Used plastic material as granules (average composition: HDPE/LDPE/PP=60/20/20) is homogenized with the stabilizers (Table 17) in a screw mixer and subsequently extruded five times in a twin-screw compounder (temperature 240° C.). The melt flow index (MFI, 190° C./10 kg) is determined in accordance with DIN 53735 F (ISO 1133/6) before the extrusions and after the 1st, 3rd and 5th extrusions.

TABLE 17

| | Stabilizer mixture | Melt flow index after | | | |
|---|---|---|---|---|---|
| | | 0 | 1st | 3rd | 5th extrusion |
| — | no stabilizer | 5.3 | 5.5 | 7.0 | 8.1 |
| Ex. 19 | 0.06% AO-1 + 0.14% P-1 + 1.0% M-1 | 5.3 | 5.1 | 5.4 | 5.7 |
| Ex. 20 | 0.13% AO-1 + 0.07% P-1 + 1.0% M-1 | 5.3 | 4.8 | 5.1 | 5.2 |
| Ex. 21 | 0.16% AO-1 + 0.04% P-1 + 1.0% M-1 | 5.3 | 4.9 | 5.1 | 5.0 |
| Ex. 22 | 0.16% AO-1 + 0.04% P-1 + 1.0% M-1 + 0.1% L-1 | 5.3 | 5.2 | 5.6 | 5.7 |

The samples stabilized according to the invention exhibit only a slight increase in the melt flow index after repeated extrusion. Degradation reactions and decomposition of the polymer (chain breaking) cause an increase in the melt flow index.

After the first extrusion, the granules are converted into sheets (thickness 2 mm) at 220° C. in a press. These sheets are subjected to artificial ageing at 185° C. in a fan-assisted oven for up to 600 minutes, and the colour difference is determined, based on a white standard, in accordance with ASTM D 1925-70 (calculated according to the formula: $\Delta E=(\Delta L^2+\Delta a^2 \Delta b^2)^{1/2}$ in the Hunter coordinate system, the yellowness index being calculated in accordance with the formula: Y1=100(0.72a+1.79b)/L) (Table 18).

TABLE 18

| | Stabilizer mixture | Colour change ($\Delta$E) after | | |
|---|---|---|---|---|
| | | 0 | 300 | 600 min |
| — | no stabilizer | 50 | 62 | >100 |
| Ex. 19 | 0.06% AO-1 + 0.14% P-1 + 1.0% M-1 | 50 | 51 | 52 |

TABLE 18-continued

| | Stabilizer mixture | Colour change ($\Delta$E) after | | |
|---|---|---|---|---|
| | | 0 | 300 | 600 min |
| Ex. 20 | 0.13% AO-1 + 0.07% P-1 + 1.0% M-1 | 50 | 52 | 60 |
| Ex. 21 | 0.16% AO-1 + 0.04% P-1 + 1.0% M-1 | 50 | 51 | 56 |

The colour difference values show only a slight increase after artificial ageing in the recyclates stabilized according to the invention. The increase in the colour difference values indicates increasing colour discoloration and decomposition of the samples.

EXAMPLES 23–24

For the investigations a used plastic mixture of the composition

80% of PO lightweight

15% of PS

2% of PET and

3% of PVC is used.

39 g of the used plastic mixture are compounded for 10 minutes in a Brabender W 50 mixing chamber held at 200° C. (40 rpm). The additives (Table 19) are introduced into the mixing chamber right at the beginning together with the plastic mixture. After 10 minutes, the mixing is stopped, and the polymer material is removed from the mixing chamber and pre-pressed for 1 minute at about 20 kN at 30° C.

Sheets having a thickness of 2 mm are produced from this pressing at 200° C./50 kN.

Test specimens are stamped out of these sheets and aged at 1 10° C. in a fan-assisted oven. The ageing is continued until the samples become brittle, which is checked by a flexural test. The results of the artificial ageing are shown in Table 19.

TABLE 19

Artificial ageing at 110° C., flexural test

| | Stabilizer mixture | Days before embrittlement |
|---|---|---|
| — | no stabilizer | 4 |
| Ex. 23 | 0.05% AO-1 + 0.05% P-1 + 0.10% M-1 | 11 |
| Ex. 24 | 0.03% AO-1 + 0.07% P-1 + 0.10% M-2 | 37 |

The following stabilizers are used in the examples described above:

| | |
|---|---|
| AO-1 | Pentaerythrityl ester of β-(3,5-di-tert-butyl-4-hydroxyphenyl)propionic acid |
| AO-2 | 2,2'-Ethylidenebis(4,6-di-tert-butylphenol) |
| P-1 | Tris(2,4-di-tert-butylphenyl)phosphite |
| M-1 | Calcium oxide |
| M-2 | Zinc oxide |

-continued

L-1

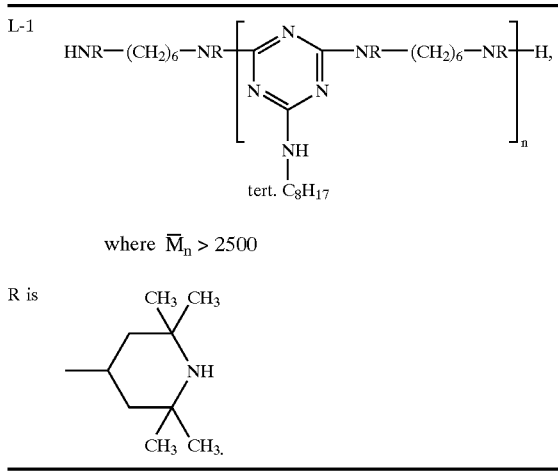

where $\overline{M}_n > 2500$

R is

What is claimed is:

1. A stabilizer mixture, suitable for the stabilization of a mixture of recycled plastics obtained from domestic, commercial and industrial waste or from recycled material collections, which mixture of plastics is polyolefin with minor amounts of polystyrene, polyester and poly(vinyl chloride), which comprises per 100 parts (by weight)
    (A) as component a) 5–50 parts of the pentaerythrityl ester of β-(3,5-di-tert-butyl-4-hydroxyphenyl) propionic acid, as component b) 5–50 parts of tris-(2,4-di-tert-butylphenyl)phosphite and as component c) 5–90 parts of calcium oxide;
    (B) as component a) 5–50 parts of the octadecyl ester of β-(3,5-di-tert-butyl-4-hydroxyphenyl)propionic acid, as component b) 5–50 parts of tris-(2,4-di-tert-butylphenyl)phosphite and as component c) 5–90 parts of calcium oxide;
    (C) as component a) 5–50 parts of 2,2'-ethyliden-bis-(4,6-di-tert-butylphenol), as component b) 5–50 parts of tris-(2,4-di-tert-butylphenyl)phosphite and as component c) 5–90 parts of calcium oxide;
    (D) as component a) 10–30 parts of the octadecyl ester of β-(3,5-di-tert-butyl-4-hydroxyphenyl)propionic acid, as component b) 10–30 parts of tris-(2,4-di-tert-butylphenyl)phosphite and as component c) 30-70 parts of calcium oxide; or
    (E) as component a) 5–30 parts of the octadecyl ester of β-(3,5-di-tert-butyl-4-hydroxyphenyl)propionic acid, as component b) 5–30 parts of tris-(2,4-di-tert-butylphenyl)phosphite, as component c) 5–40 parts of calcium oxide, as well as 10–50 parts of calcium stearate.

2. A process for the stabilization of a mixture of recycled plastics obtained from domestic, commercial and industrial waste or from recycled material collections, which mixture of plastics is polyolefin with minor amounts of polystyrene, polyester and poly(vinyl chloride), which process comprises adding to said mixture of recycled plastics 0.01 to 15% by weight of said recycled plastics a stabilizer mixture which comprises per 100 parts (by weight of the stabilizer mixture)
    (A) as component a) 5–50 parts of the pentaerythrityl ester of β-(3,5-di-tert-butyl-4-hydroxyphenyl) propionic acid, as component b) 5–50 parts of tris-(2,4-di-tert-butylphenyl)phosphite and as component c) 5–90 parts of calcium oxide;
    (B) as component a) 5–50 parts of the octadecyl ester of β-(3,5-di-tert-butyl-4-hydroxyphenyl)propionic acid, as component b) 5–50 parts of tris-(2,4-di-tert-butylphenyl)phosphite and as component c) 5–90 parts of calcium oxide;
    (C) as component a) 5–50 parts of 2,2'-ethyliden-bis-(4,6-di-tert-butylphenol), as component b) 5–50 parts of tris-(2,4-di-tert-butylphenyl)phosphite and as component c) 5–90 parts of calcium oxide;
    (D) as component a) 10–30 parts of the octadecyl ester of β-(3,5-di-tert-butyl-4-hydroxyphenyl)propionic acid, as component b) 10–30 parts of tris-(2,4-di-tert-butylphenyl)phosphite and as component c) 30-70 parts of calcium oxide; or
    (E) as component a) 5–30 parts of the octadecyl ester of β-(3,5-di-tert-butyl-4-hydroxyphenyl)propionic acid, as component b) 5–30 parts of tris-(2,4-di-tert-butylphenyl)phosphite, as component c) 5–40 parts of calcium oxide, as well as 10–50 parts of calcium stearate.

3. A process for the stabilization of a recycled mixture of plastics which mixture is 80% by weight of polyolefin, 15% by weight of polystyrene, 2% by weight of polyester and 3% by weight of poly(vinyl chloride), which process comprises adding to said mixture of recycled plastics 0.03% of the pentaerythrityl ester of β-(3,5-di-tert-butyl-4-hydroxyphenyl)propionic acid; 0.07% of tris(2,4-di-tert-butylphenyl)phosphite; and 0.10% of zinc oxide, based on the weight of the recycled plastics.

* * * * *

UNITED STATES PATENT AND TRADEMARK OFFICE
CERTIFICATE OF CORRECTION

PATENT NO.    : 6,525,158 B1                                        Page 1 of 1
DATED         : February 25, 2003
INVENTOR(S)   : Kurt Hoffmann et al.

It is certified that error appears in the above-identified patent and that said Letters Patent is hereby corrected as shown below:

<u>Title page,</u>
Item [30], should read:

-- (30)  Foreign Application Priority Data

Sep. 25, 1992   (CH)....................3011/92 --.

Item [63], should read:

-- (63)  Related U.S. Application Data

Continuation of application No. 08/723,717, filed on Sep. 30, 1996, now abandoned, which is a continuation of application No. 08/403,912, filed Mar. 21, 1995, which is a 371 of PCT/EP93/02485, now abandoned. --.

<u>Column 1,</u>
Line 4, First paragraph under the title should read:

-- This application is a continuation of application Ser No. 08/723,717, filed Sep. 30, 1996, now abandoned, which is a continuation of application Ser. No. 08/403,912, filed Mar. 21, 1995, which is a 371 of PCT/EP93/02485, which is now abanboned. --.

Signed and Sealed this

Twenty-ninth Day of July, 2003

JAMES E. ROGAN
*Director of the United States Patent and Trademark Office*